E. DUCHESNE.
STAYBOLT FASTENING.
APPLICATION FILED NOV. 26, 1919.
1,386,691.
Patented Aug. 9, 1921.
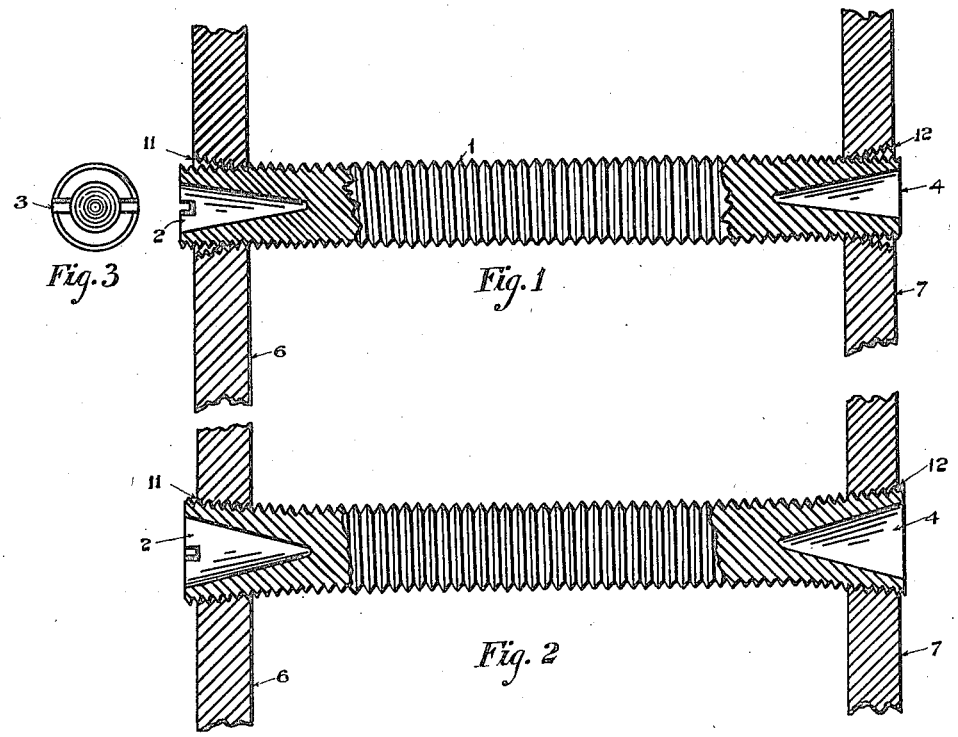
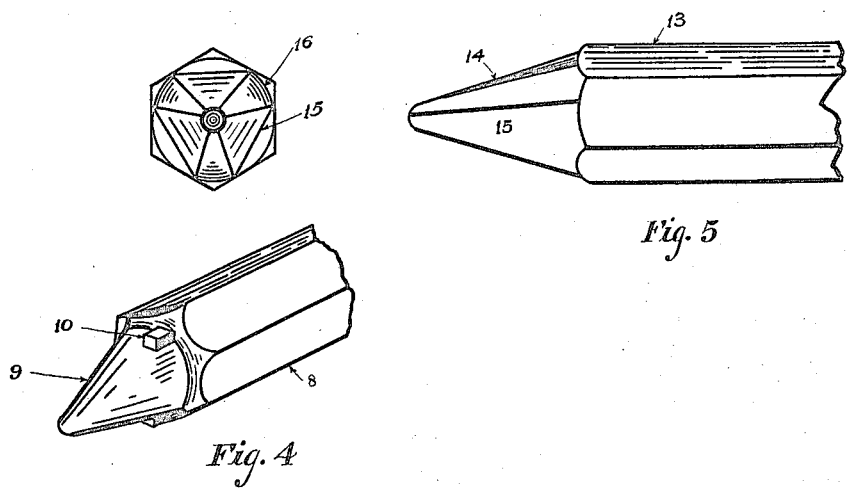
Inventor
E. Duchesne
By C.J. Fetherstonhaugh Attorney

UNITED STATES PATENT OFFICE.

ERNEST DUCHESNE, OF MONTREAL, QUEBEC, CANADA.

STAYBOLT-FASTENING.

1,386,691. Specification of Letters Patent. Patented Aug. 9, 1921.

Application filed November 26, 1919. Serial No. 340,955.

*To all whom it may concern:*

Be it known that I, ERNEST DUCHESNE, a subject of the King of Great Britain, and residing at 1314 Des Erables street, in the city and district of Montreal, in the Province of Quebec, in the Dominion of Canada, have invented a new and useful Staybolt-Fastening, of which the following is the specification.

The invention relates to improvements in stay bolt fastenings, as described in the present specification and illustrated in the accompanying drawings that form part of the same.

The invention consists essentially in the novel formation, whereby a new application of the bolt is made that insures a tight joint.

The objects of the invention are to facilitate the operations in boiler construction; to eliminate the leaks incident to the loosening of the bolts; to reduce the cost of maintenance; and generally to provide a bolt for the aforesaid purpose, that is cheap to manufacture, efficient in the operation of building and serviceable and durable in effect.

In the drawings, Figure 1 is a longitudinal sectional view of the bolt as first screwed into position.

Fig. 2 is a longitudinal sectional view of the bolt, showing the threaded ends expanded to fill in the threaded tapered holes in the boiler plate.

Fig. 3 is an end elevation of the bolt.

Fig. 4 is a detail of the driver.

Fig. 5 is a detail of the swaging tool.

Like numerals of reference indicate corresponding parts in each figure.

Referring to the drawings, the bolt 1 is shown as formed of a short piece of metal rod threaded throughout its length and having at one end the tapered recess 2 and the cross slot 3, and at the other end the tapered recess 4 and no cross slot, both recesses extending inwardly beyond the inner faces of the boiler plates 6 and 7.

The driver 8 is formed with the centering tongue 9 and ribs 10 fitting into an end recess and cross slot respectively and having a suitable handle for driving the bolt 1 into the tapered threaded bolt holes 11 and 12 in the plates 6 and 7, the tapered walls of said holes converging toward their inner ends. The bolt 1 screws into the plates 6 and 7 being inserted from one end and the thread on the bolt engages the threads in the holes 11 and 12, but most of the threads are not closely engaged by the bolt and because of the taper the distance from actual contact is increasingly greater from the inner to the outer ends of the holes.

The application of the bolt is completed by the swaging tool 13 preferably formed with a tapered swaging head 14 having flat faces 15 between arc swaging faces 16, so that by hammering and turning the tool no disruption occurs in expanding the heads of the bolt 1 into close engagement with the walls of the holes 11 and 12 from end to end.

Some changes may be made in the details of construction without departing from the spirit of the invention, and so long as they are within the scope of the claim for novelty following, the protection accorded shall not be invalidated.

What I claim is:—

A stay bolt joint in which there is a plate having a threaded hole converging toward the inner end and a bolt threaded into said hole and swaged over to the wall of said hole into mesh with the threads thereof and having a tapered recess projecting beyond the inner surface of said plate.

Signed at the city of Montreal, Province of Quebec, Dominion of Canada, this 23rd day of October 1919.

ERNEST DUCHESNE.